United States Patent [19]

Marks

[11] Patent Number: 5,025,345

[45] Date of Patent: Jun. 18, 1991

[54] OVERLOAD PROTECTOR MODULE AND BUILDING ENTRY PROTECTOR WITH INTEGRALLY MOLDED MODULAR JACK

[75] Inventor: Robert J. Marks, Carpentersville, Ill.

[73] Assignee: Northern Telecom Limited, Montreal, Canada

[21] Appl. No.: 18,290

[22] Filed: Feb. 24, 1987

[51] Int. Cl.[5] .............................................. H02H 3/22

[52] U.S. Cl. ..................................... 361/119; 361/129

[58] Field of Search ............................... 361/117-120, 361/129; 337/28-34; 439/716, 92, 922, 669

[56] References Cited

U.S. PATENT DOCUMENTS

| | | | |
|---|---|---|---|
| 1,267,223 | 5/1918 | Hill | 361/119 X |
| 3,255,330 | 6/1966 | MacKenzie et al. | 337/34 X |
| 3,743,888 | 7/1973 | Baumbach | 361/119 |
| 4,179,170 | 12/1979 | Splitt et al. | 337/32 X |
| 4,313,147 | 1/1982 | Uchida et al. | 361/119 |
| 4,317,154 | 2/1982 | Passarella | 361/119 |
| 4,594,635 | 6/1986 | Scheithauer et al. | 361/119 |
| 4,642,733 | 2/1987 | Schacht | 361/118 X |
| 4,654,743 | 3/1987 | Ruehl et al. | 361/119 X |

FOREIGN PATENT DOCUMENTS

| | | | |
|---|---|---|---|
| 2004347 | 8/1971 | Fed. Rep. of Germany | 337/29 |
| 2750638 | 11/1977 | Fed. Rep. of Germany | 361/119 |

*Primary Examiner*—William M. Shoop, Jr.
*Assistant Examiner*—A. Jonathan Wysocki
*Attorney, Agent, or Firm*—Foley & Lardner

[57] ABSTRACT

Overvoltage protector module having a modular jack mounted upon the module housing in a position remote from a base of the module which carries line and ground terminals. Conveniently, the modular jack has a body which is integrally molded with the module housing. In a construction in which the base, modular jack and an overvoltage protection unit are all in line, the housing and modular jack provide a columnar unit with the housing lying within the confines of the boundary of the housing which is of similar size and shape to the jack when taken in cross-section.

12 Claims, 3 Drawing Sheets

OVERLOAD PROTECTOR MODULE AND BUILDING ENTRY PROTECTOR WITH INTEGRALLY MOLDED MODULAR JACK

BACKGROUND OF THE INVENTION

1. Field of the Invention

This invention relates to an overload protector module and building entry protector for telecommunications systems.

2. Related Art

Protector modules are usually provided in building entry protectors within buildings to protect electrical and electronic equipment in telecommunications systems against power surges arriving over telecommunications lines. Protector modules are usually mounted in a region commonly referred to as the "protector module field".

A building entry protector also carries building circuit connection devices, such as quick clip blocks and/or modular jacks to enable a plug-in connection to be made between a company telecommunications line and the subscriber's wiring at his premises. The quick clip blocks or modular jacks are mounted in a group in a connector field on the subscriber's side of the protector modules, the blocks or modular jacks being held upon a mounting block. On the subscriber's side of the protector modules, the modules are wired to the connector blocks or the modular jacks by backplane wiring which lies behind the mounting blocks of the modules and connectors. In this conventional building entry protector structure, the protector module field and the connector field lie side-by-side for ease of access to either the modules for test or removal purposes or to the connector field for connecting or disconnecting the subscriber's end user equipment into the telecommunications lines. It is not unusual to provide the mounting blocks for the protector modules and the quick clip blocks or modular jacks upon a hinged part of the case of the protector to enable the case to be opened for access to the backplane wiring. In some entry protectors, both quick clip blocks and the modular jacks are included, each module connected in parallel to a quick clip block and to a modular jack to give a choice to the subscriber regarding the type of connection he may wish to make. In such protectors, the two types of connectors are grouped into two fields which lie side-by-side with the protector module field. As may be seen, the conventional building entry protectors are rendered bulky, because the side-by-side field arrangement for connectors and protector modules add to the overall face area of the protectors. The face area of a protector affects its cost, because of the materials being used, and may place restrictions on the wall locations where the protectors may be mounted.

SUMMARY OF THE INVENTION

The present invention enables the face area of a building entry protector to be minimized while allowing for all the required field arrangements.

Accordingly, the present invention provides an overvoltage protector module comprising a housing having a base; a first pair of line terminals and a ground terminal in the base; a modular jack provided upon the housing in a position remote from and on the opposite side of the housing from the base, a second pair of line terminals provided by the modular jack with the terminals of the second pair connected, by circuit lines, one in a circuit with each of the terminals of the first pair; and an overvoltage protection unit means inside the housing, the overvoltage protection unit means having two first electrode means, one for each circuit, with each first electrode means connected by its respective circuit to respective terminals of the first and second pairs, the overvoltage protection unit means also having second electrode means spaced apart from each of the first electrode means to define an arc gap with each of said first electrode means the second electrode means electrically connected to the ground terminal.

It follows that in use, with protector modules assembled into a building entry protector, the protector module field is overlaid by the connector field which is occupied by the modular jacks. Thus in the building entry protector, because these fields are in overlying relationship and are not side-by-side, the face area of the fields is minimized.

In a particularly practical construction, the first pair of terminals and the ground terminal face in one direction away from the housing, and the modular jack has an opening for plug acceptance, the opening facing away from the housing in the opposite direction. Conveniently, the base, modular jack and the overvoltage protection unit means are substantially in line and this enables the housing and modular jack to be a columnar unit with the base at one end and the modular jack at the other end. This allows for a particularly advantageous construction wherein in an end view of the columnar unit, substantially the whole of the jack lies within the confines of a boundary of the housing.

In a further specific arrangement, the protector module includes a third pair of terminals located in the base and these terminals are connected, by respective circuits, one to each terminal of the first pair with each terminal of the third pair in parallel in its circuit with an associated terminal of the second pair. The use of a third pair of terminals may be achieved without increasing the cross-sectional area of the housing beyond that necessary for the modular jack.

The invention also includes a building entry protector comprising a casing having mounting means carrying a plurality of protector modules in a protector module field, each protector module comprising a housing having a base; a first pair of line terminals and a ground terminal in the base; a modular jack provided upon the housing in a position remote from and on the opposite side of the housing from the base, a second pair of line terminals provided by the modular jack with the terminals of the second pair connected, by circuit lines, one in a circuit with each of the terminals of the first pair; and an overvoltage protection unit means inside the housing, the overvoltage protection unit means having two first electrode means, one for each circuit, with each first electrode means connected by its respective circuit to respective terminals of the first and second pairs, the overvoltage protection unit means also having second electrode means spaced apart from each of the first electrode means to define an arc gap with each of said first electrode means, the second electrode means electrically connected to the ground terminal; and the modular jacks located in a connector field which overlies the protector module field.

BRIEF DESCRIPTION OF THE DRAWINGS

Embodiments of the invention will now be described by way of example, with reference to the accompanying drawings, in which.

DESCRIPTION OF THE PREFERRED EMBODIMENT

Figure 1:
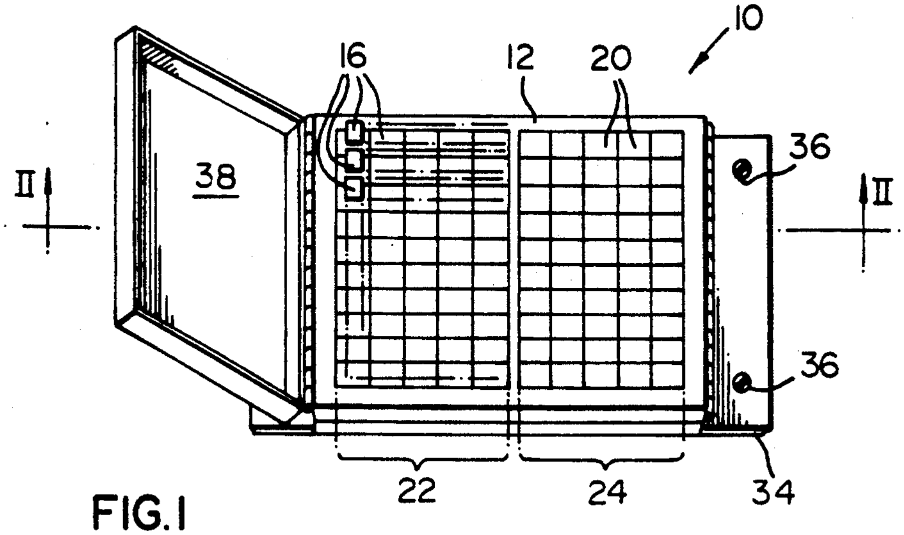
FIG. 1 PRIOR ART
FIG. 1 is a partly isometric front view of a prior building entry protector of one construction with a protector module cover in an open position to show detail.
Figure 2:
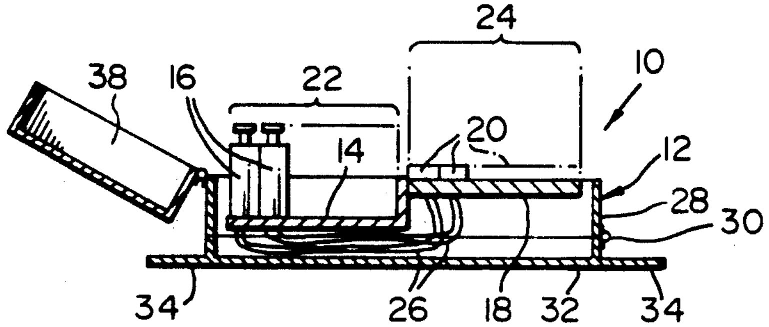
FIG. 2 PRIOR ART
FIG. 2 is a cross-sectional view taken along line II—II of the protector of FIG. 1.

As shown in FIGS. 1 and 2, a building entry protector 10 of a prior construction, comprises a case 12 having a mounting block 14 for protector modules 16 arranged in a group and a mounting block 18 for modular jacks 20 also arranged in a group. As may be seen from FIG. 1 and 2, the two mounting blocks 14 and 18 lie in side-by-side relationship and the modules 16 lie in a protector module field 22 whereas the grouped modular jacks lie in a connector field 24. These two fields lie side-by-side in the casing so that the face area of the protector, as viewed in FIG. 1, has the necessary size and shape to accommodate these two fields. Each of the protector modules 16 is of the construction described in U.S. Pat. No. 4,594,635 granted June 10, 1986 in the names of E. A. Scheithauer and D. F. Jaycox and entitled "Overload Protector for Communications Systems".

As may be seen from FIG. 2, it is necessary for the subscriber's side of the protection modules 16 to be electrically connected with each of the modular jacks 20 by backplane wiring 26 which lies behind the mounting blocks 14 and 18. For ease of access to the wiring, a front part 28 of the casing is hinged at 30 to a rear part 32 to enable the casing to be opened.

In addition, the casing is provided with two side flanges 34 at its sides for mounting upon a wall, for instance by the use of screws 36. Further to this, the group of protector modules is provided with a lid 38 which is normally in position covering the modules, but as shown in FIGS. 1 and 2, is hinged for opening purposes for access to the protector modules.

Figure 3:
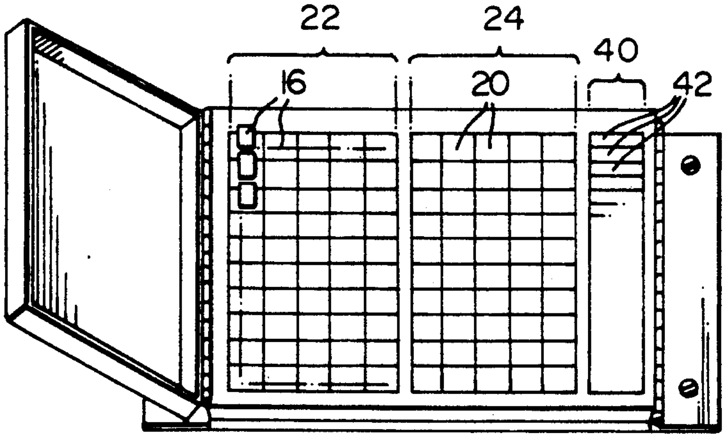
FIG. 3 PRIOR ART
FIG. 3 is a partly isometric front view of another prior building entry protector.

FIG. 3 shows a front view of a second prior art construction which is similar to that shown in FIGS. 1 and 2, but, in addition, includes a further connector field 40 lying at the side of connector field 24. The connector field 40 is equipped with quick clip blocks 42. As can be seen from FIG. 3, the three fields 22, 24 and 40 lie side-by-side across the protector and the face area of the protector viewed in FIG. 3 is increased accordingly beyond that of the construction in FIGS. 1 and 2.

Figure 4:
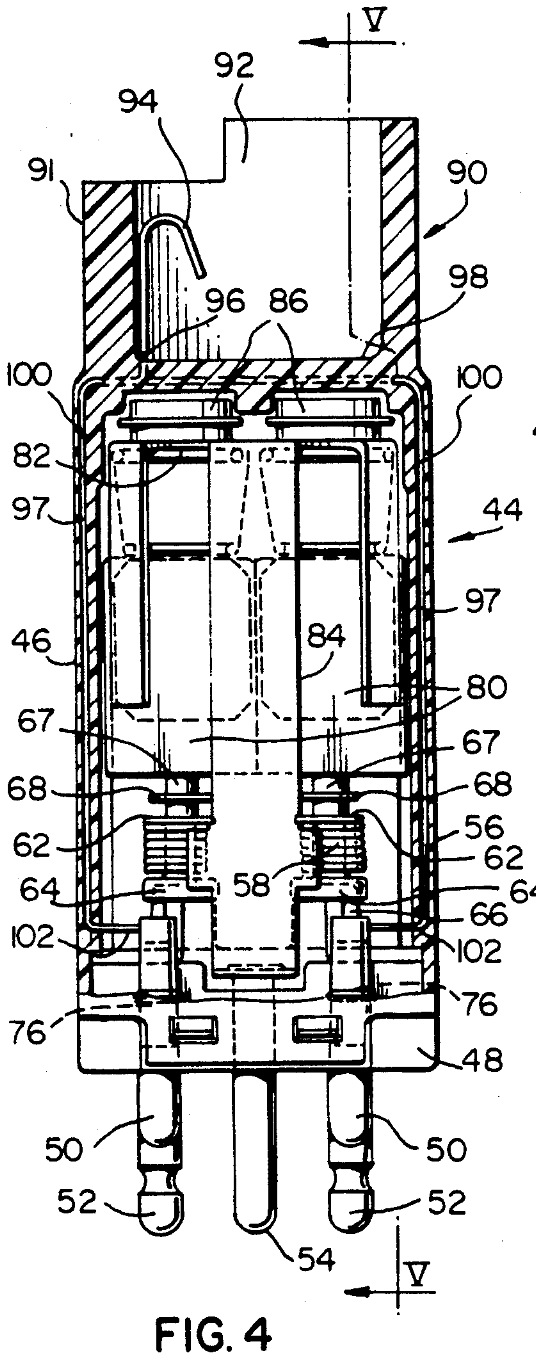
FIG. 4 is a side elevational view in cross-section and on a larger scale than previous Figures, of a protector module according to a first embodiment of the invention.
Figure 5:
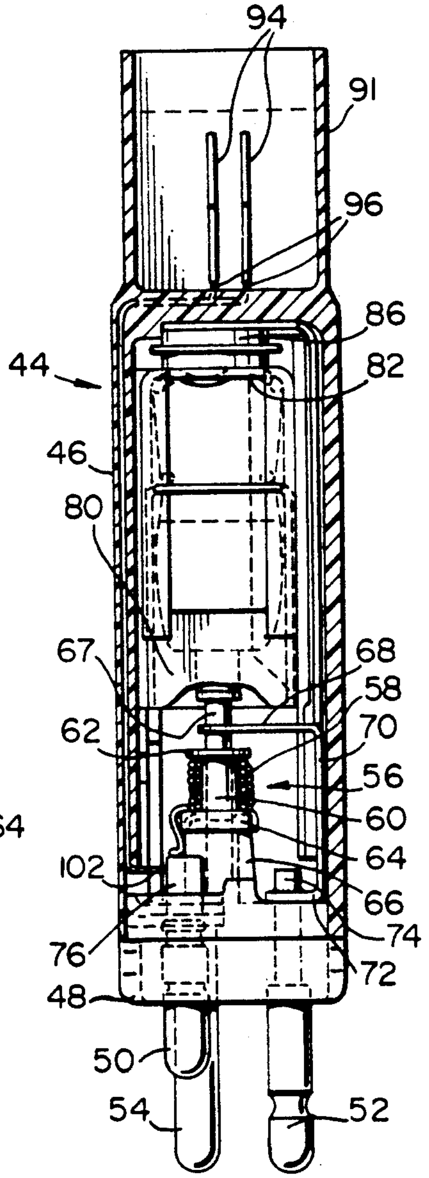
FIG. 5 is a cross-sectional view of the protector module in FIG. 4 taken along line V—V in FIG. 4.
Figure 6:
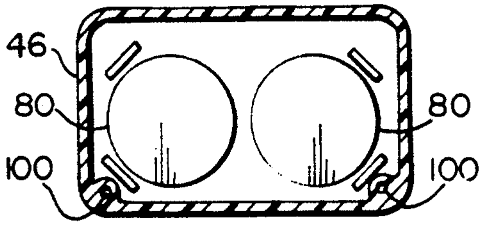
FIG. 6 is a cross-sectional view of the module in FIG. 4 taken along line VI—VI in FIG. 4.

The invention is concerned with a protector module which in use enables the face area of a building entry protector to be minimized so as not only to reduce its cost, but also to render it suitable for mounting in certain wall positions. As shown in FIGS. 4 and 5, a protector module 44 of the first embodiment comprises a straight-sided columnar housing 46 which is of rectangular cross-section as shown in FIG. 6. The housing has a base 48 carrying two pairs of line pins 50 and 52 extending from the base. Each pin 50 is an equipment connection pin and the pins 52 are outside plant pins. A ground pin 54 is also provided extending from the base. The protector module 44 has overvoltage protection unit means and a current overload protection means within the housing and the arrangement is similar to that described in U.S. Pat. No. 4,594,635 granted June 10, 1986 in the names of E. A. Scheithauer and D. A. Jaycox and entitled "Overload Protector for Communications Systems". The arrangement within the housing will now be briefly described.

The terminal pins 50 are connected to the terminal pins 52, one pin 50 to each of the pins 52 by a circuit. Within each circuit, the current overload protection means comprises a current overload protection unit 56. Each current overload protection unit comprises a heat coil 58 formed by windings of insulated conductor, the windings wrapped around a spool 60 having a flat flange 62 at an upper end and a hollow annular flange 64 at its lower end. Flange 64 fits over a boss 66 formed on the base 48 and the boss positions the heat coil and prevents sideways movement. A shaft 67 extends upwardly from within the spool, and the shaft is connected by an arm 68 of a line bracket 70 with the associated pin 52. For this purpose, the line bracket 70 has a lower leg 72 soldered or otherwise electrically connected to an upper end 74 of the pin 52. At one end, the insulated conductor in the coil 58 is electrically connected to the spool 60 which may be at either of the flanges 62 and 64. At the other end the conductor is electrically connected to an upper end 76 of the associated pin 50. Each pin 50 is thus electrically connected with its associated pin 52 through the coil 56, the spool 60, the shaft 67 and then through the line bracket 70. Each current overload protection unit is thus disposed in series between its associated line pins 50 and 52. Also, as can be seen from FIG. 4, the two current overload units lie side-by-side within the housing 46.

Above the current overload protection means is disposed an overvoltage protection unit means. This comprises two overvoltage protection units 80, one unit 80 being associated with each of the current overload protection units. As described in above-mentioned U.S. Pat. No. 4,594,635, each of the overvoltage protection units 80 is of gas tube type of conventional construction and comprises two electrodes defining an arc gap between them. A lower electrode of each overvoltage protection unit bears against the upper end of the shaft 67 of its associated circuit while the upper electrode contacts an upper flange 82 of a ground assembly which comprises a vertical ground bracket 84 extending down inside the housing 46 and being electrically connected to the ground pin 54. Backup protectors 86 are located above the overvoltage protection units 80 as described in the aforementioned patent.

The protector module 44 differs basically from that described in aforementioned U.S. Pat. No. 4,594,635 in that in place of a handle at the upper end of the casing, the protection module 44 has a modular jack 90. The modular jack 90 has a body 91 of rectangular shape in a cross-section normal to the columnar direction of the housing and is of a size and shape to have an opening 92 for acceptance of a plug connected to a subscriber's private telecommunications wiring. As can be seen from FIGS. 4 and 5, the shape of the modular jack is convenient in that it adds to the columnar effect of the housing 46 to provide a columnar unit with the housing. In end view of the columnar unit, the body of the modular jack lies within the confines of a boundary to the housing and is slightly narrower in both the side elevations, as shown by FIGS. 4 and 5.

Conveniently, the structure of the module according to the description in U.S. Pat. No. 4,594,635, enables the columnar housing 46 to be of similar size and shape in cross-section (FIG. 6) to the body of the modular jack. This enables a body 91 to be molded together with the housing 46 by a simple molding operation. The modular jack 90 is of a conventional construction and has a plurality of spring beam contacts 94 arranged in usual fashion within the opening 92 and these contacts have terminals 96 at a lower end of the modular jack.

Figure 7:
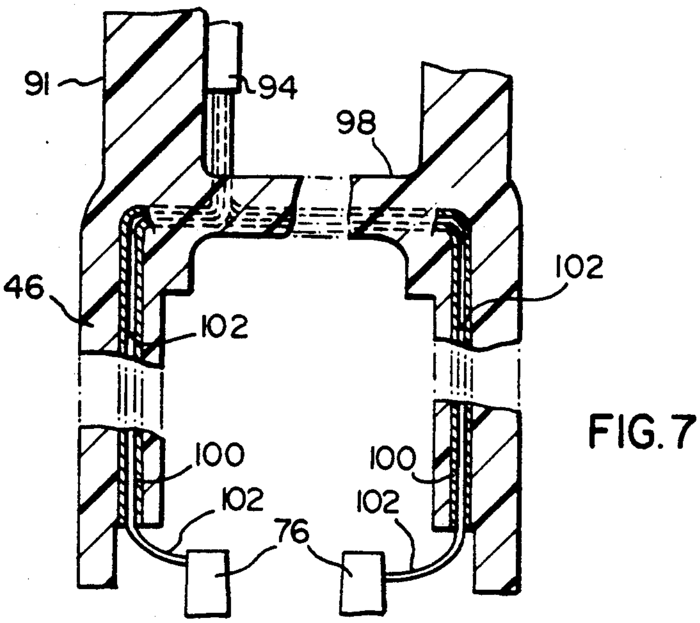
FIG. 7 is a scrap cross-sectional view on a larger scale than FIG. 4 and in the direction of FIG. 4 showing a detail of the module of the first embodiment.

A pair of terminals 96 of the spring beam contacts 94 are connected by circuit lines 97 to terminal pins 50, one terminal to each terminal pin. The paths of the circuit lines are shown in FIGS. 4, 5 and 6. As may be seen, each circuit line 97 extends from a respective pin 50 and up an inside corner of the housing 46. Both circuit lines change direction at the top of the housing 46 to reach terminals 96 with both circuit lines lying within a wall 98 which extends across the protector module at the junction of the housing 46 with body 91. As shown in greater detail in FIG. 7, each circuit line comprises a conductive tube 100 which is embedded within the housing 46 and wall 98, the tube terminating at its lower end by opening outwardly from the material of the housing. Each circuit line also comprises a conductive wire 102 which is connected at one end to an associated terminal pin 50. Each wire 102 is a sliding fit within its tube to make electrical contact with it and each wire is of sufficient length to enable it to be inserted into its tube with the base 48 aligned with, but spaced from the housing before assembly to it. The base carrying the terminal pins, overvoltage protection unit means and the current overload protection means is then assembled into the housing in the manner described in aforementioned U.S. Pat. No. 4,594,635. During assembly and as the base 48 is moved upwardly into position, the wires 102 are pushed upwardly into their respective tubes 100.

In the construction of the first embodiment, the terminal pins 50, 52 and 54 extend outwardly from the base of the housing in one direction while the opening 92 of the modular jack extends from the top of the housing and in the opposite direction. In addition to this, the straight-sided columnar unit of housing and modular jack provide a structure which enables protection modules to be disposed closely adjacent to each other in a conventional mounting block. The construction is such as to make adequate use of the available space while minimizing the total size of the protector module including the modular jack. In fact, because of the columnar effect, the terminal pins 50, 52 and 54 are substantially in alignment with the current overload protection units, the overvoltage protection units and the modular jack.

In modifications (not shown) of the first embodiment, the circuit lines 97 are replaced by alternatives. These include the incorporation of conductive wires, instead of tubes, embedded within the plastic of the molding of the housing, plated or otherwise, deposited conductive layers upon a carrier layer embedded within or carried upon the plastic, or a flexible conductor in or carried upon a plastic film adhered to the housing. In each case, provision is necessary to ensure electrical connection is made along each circuit line between the pins 50 and the spring beam contacts 94 and the arrangement may necessarily be such as to make positive electrical contact before assembly of the base 48 onto the housing an exemplification of which is given i the first embodiment.

Figure 8:
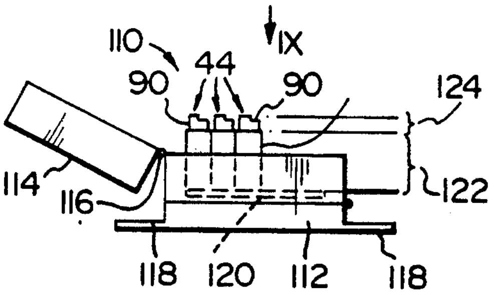
FIG. 8 relates to a second embodiment and is an end view of a building entry protector incorporating protector modules according to the first embodiment.
Figure 9:
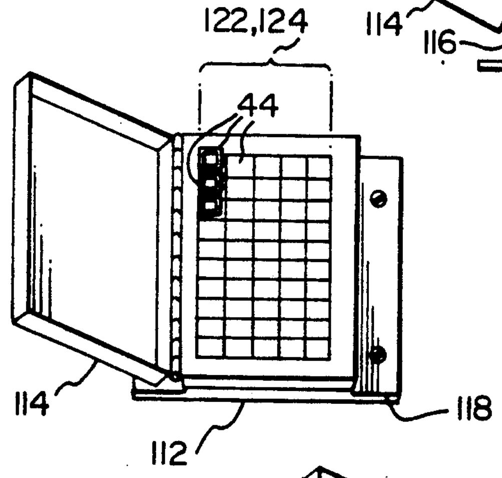
FIG. 9 is a partly isometric front view of the protector of FIG. 7 taken in the direction of arrow IX in FIG. 8.

The protection module according to the invention and as described in the first embodiment or the modifications thereof may be incorporated into a building entry protector according to a second embodiment, such as is shown in FIGS. 8 and 9. As shown in FIGS. 8 and 9, the protector 110 comprises a casing 112 with a lid 114 hinged at position 116 to the casing. The casing has side flanges 118 for attachment to a wall in the manner described for the prior art constructions of FIGS. 1, 2 and 3.

Within the casing is located a module mounting block 120. This mounting block is of conventional construction and has terminals for accepting the terminals 50, 52 and 54 of a plurality of protector modules 44 so as to hold them in a group within the casing. As shown in FIGS. 8 and 9, a plurality of the protector modules 44 are disposed in positions in the mounting block with the protector modules lying closely side-by-side in conventional fashion. Thus, the protector modules provide a protector module field 122 as is indicated in FIG. 8.

However, as each of the protector modules has a modular jack 90 mounted upon its housing, then in the assembly of the modular group, all the modular jacks lie in alignment as shown in FIG. 8 and within a connector field 124 which overlies the protector module field 122. The cover 114 may be closed completely over the protector modules so as to cover both of the fields 122 and 124.

It follows that with the use of a plurality of protector modules 44 in a building entry protector, the protector module field will always be overlaid by a connector field. Because of this arrangement as shown in FIGS. 8 and 9, then the face area of the building entry protector is minimized as shown by FIG. 9, i.e. solely to accommodate the group of protector modules. Thus the need to have a larger face area to accommodate a connector field formed by the modular jacks is avoided so that a face area similar to that created by the prior construction of FIGS. 1 and 2 is not required.

It will be appreciated that by the use of the modules 44, a much simpler construction of building entry protector is made possible and in minimizing the size of the protector, the protector cost is also minimized.

It will also be appreciated that no backplane wiring is required to connect the protector modules with the modular jacks because any necessary wiring is pre-built into the housing in the form of the insulated wires 100.

It is a simple matter to disconnect the subscriber's telecommunications wiring from the telephone company wiring merely by detaching the plugs from the modular jacks. Alternatively, the subscriber's telecommunications wiring may be disconnected from the incoming lines merely by pulling out a selected protector module to its detent position which, as is well known, removes the terminal pins 50 from the mounting block while allowing the connector pins 52 to remain in contact with the incoming cable lines for test purposes. With the terminal pairs 50 disconnected and a plug from the subscriber's wiring removed from the modular jack, the jack is accessible for use with an appropriate plug from test equipment to enable the circuit to be tested through pins 52 to the outside plant.

Figure 10:
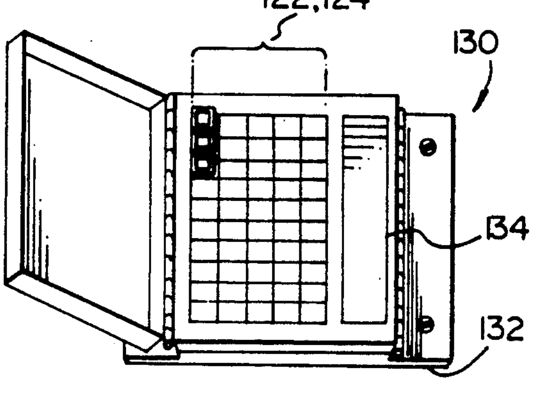
FIG. 10 is a view similar to FIG. 9 of a building entry protector according to a third embodiment.

In a third embodiment, shown in FIG. 10, a building entry protector 130 is similar in construction to that shown in FIGS. 8 and 9 except that in this case the casing 132 is slightly wider so as to accommodate quick clip connectors 134. Each of these connectors is joined to terminals on the back face of the connector block by insulated wiring (not shown) and this wiring, for each pin 50 of each protector module, is in parallel with the insulated wires 100 which extend to the terminals 96. Thus with this arrangement, the subscriber may choose which type of connector he wishes to use i.e. the modular jacks 90 or the quick clip connectors 134. While the third embodiment does show that the quick clip connectors lie in a connector field 138 which lies at the side of the protector modules so as to increase the size of the casing 132, nevertheless three connector fields are made possible with this arrangement without substantial increase in the size of the building entry protector. This is because the field 124 overlies the protector module field 122. However, this structure is still significantly smaller than the prior art structure illustrated in FIG. 3 which also includes two connector fields.

What is claimed is:

1. An overvoltage protector module comprising a housing having a base; a first pair of line terminals and a ground terminal in the base; a modular jack provided upon the housing in a position remote from and on the opposite side of the housing from the base, a second pair of line terminals provided by the modular jack with the terminals of the second pair connected, one in circuit with each of the terminals of the first pair; a third pair of line terminals connected one in circuit with each of the terminals of the first pair, the terminals of the third pair extending from the base; a current overload protection unit located in series between each terminal of the first pair and the corresponding in-circuit terminal of the second pair and in series between each terminal of the first pair and the corresponding in-circuit terminal of the third pair; and an overvoltage protection unit means inside the housing, the overvoltage protection unit means having two first electrode means, electrically connected one to each terminal of the first pair, the overvoltage protection unit means also having second electrode means spaced apart from each of the first electrode means to define a gap with each of said first electrode means, the second electrode means electrically connected to the ground terminal.

2. A protector module according to claim 1 wherein the first pair of terminals and the ground terminal face in one direction away from the housing and the modular jack has an opening for acceptance of a plug, said opening facing away from the housing and in the opposite direction.

3. A protector module according to claim 2 wherein the base, the modular jack and the overvoltage protection unit means are substantially in line.

4. A protector module according to claim 3 wherein the housing and modular jack provide a columnar unit.

5. A protector module according to claim 4 wherein in end view upon the columnar unit of housing and modular jack, substantially the whole of the jack lies within the confines of a boundary to the housing.

6. A protector module according to claim 1 wherein the overvoltage protection unit means comprises two overvoltage protection units, one unit for each circuit, said two first electrodes included one in each unit and the second electrode means comprises two second electrodes, one in each unit, with the first and second electrodes of each unit spaced apart to define an arc gap.

7. A protector module according to claim 6 wherein the two overvoltage protection units are located side-by-side laterally of the housing, each overvoltage protection unit having its electrodes spaced apart in the longitudinal direction of the housing.

8. A protector module according to claim 1 wherein the housing is generally rectangular at a cross-section normal to its length and the circuit lines connecting the terminals of the first pair with terminals of the second pair extend along the housing and are located in at least one corner formed by two adjacent walls of the housing.

9. A protector module according to claim 4 wherein the housing is generally rectangular at a cross-section normal to its length and the circuit lines connecting the terminals of the first pair with terminals of the second pair extend along the housing and are located in at least one corner formed by two adjacent walls of the housing.

10. A protector module according to claim 5 wherein the housing is generally rectangular at a cross-section normal to its length and the circuit lines connecting the terminals of the first pair with terminals of the second pair extend along the housing and are located in at least one corner formed by two adjacent walls of the housing.

11. A building entry protector comprising a casing having mounting means carrying a plurality of protector modules in a protector module field, each protector module comprising a housing having a base; a first pair of line terminals and a ground terminal in the base; a modular jack provided upon the housing in a position remote from and on the opposite side of the housing from the base, a second pair of line terminals provided by the modular jack with the terminals of the second pair connected, by circuit lines, one in a circuit with each of the terminals of the first pair; and an overvoltage protection unit means inside the housing, the overvoltage protection unit means having two first electrode means, one for each circuit, with each first electrode means connected by its respective circuit to respective terminals of the first and second pairs, the overvoltage protection unit means also having second electrode means spaced apart from each of the first electrode means to define an arc gap with each of said first electrode means, the second electrode means electrically connected to the ground terminal; and the modular jacks located in a connector field overlying the protector module field.

12. A method of protecting building entry for telecommunications systems against power surges comprising the steps of:

(a) forming a plurality of protector modules each having a first pair of line terminals in a base of the module;
(b) connecting the first pair of line terminals in circuit with a second pair of terminals located remote and on an opposite side of a housing from the base of the module;
(c) connecting each terminal of the first pair also in circuit with a third pair of terminals located in the base and locating a current protection unit in series between the terminals of the first pair and corresponding in circuit terminals of the second and third pairs;
(d) electrically connecting two first electrode means of an overvoltage protection unit means inside the housing, one to each terminal of the first pair, spacing second electrode means apart from each of the first electrode means to define a gap and electrically connecting a second electrode means of the overvoltage protection unit means to a ground terminal;
(e) mounting the plurality of protector modules on a mounting block to provide a protector field surmounted by a connector field provided by the second pairs of terminals; and
(f) connecting incoming telecommunication lines to terminals of the first pairs and outgoing telecommunication lines to terminals of the second pairs.

* * * * *